Patented Dec. 5, 1922.

1,437,397

UNITED STATES PATENT OFFICE.

HAVIK BRUYN, OF BIRMINGHAM, ALABAMA.

COMPOSITION FOR PRESERVING FABRICS.

No Drawing. Application filed March 27, 1922. Serial No. 547,215.

*To all whom it may concern:*

Be it known that I, HAVIK BRUYN, a subject of the Queen of the Netherlands, residing at Birmingham, in the county of Jefferson and State of Alabama, have invented certain new and useful Improvements in Composition for Preserving Fabrics, of which the following is a specification.

My invention relates to a composition for preserving fabrics, and which is especially adapted for use as a paint or coating for covering wagon tops, tarpaulins and exposed fabrics.

The object of my invention is to produce a preservative composition or covering which is comparatively inexpensive, which can be readily compounded, and which possesses the very important characteristic of preserving its flexibility so that it will not tend to crack and break or flake off within a short time after it has been applied to the fabric and exposed to the weather. Obviously, as soon as a fabric coating or paint becomes sufficiently hard to crack it loses its protective qualities and the exposed fabric is subject to rapid deterioration.

With these ends in view I have compounded a preservative coating or paint composed essentially of linseed or boiled oil, pulverized charcoal and water having dissolved therein substantially all the soap the water will take up.

In order that those skilled in the art may fully understand and practice my invention, I will now describe in detail the preferred manner of compounding a batch of my improved fabric preservative covering.

To four parts of boiled linseed oil I add two parts of pulverized charcoal and three parts of water, having dissolved therein all of the soap, preferably green fig soap which is a green vegetable soap composed largely of figs, which the water will dissolve, and which in water of average hardness is about one heaping tablespoon of soap to the quart of water. The soap is first thoroughly dissolved in the water and then the soapy water is added slowly to the charcoal and mixed into a paste. I prefer to let this paste stand over night so that it will thicken, and then I stir in the linseed oil, adding the same slowly until it is entirely worked into the paste. This way will result in a preservative coating or paint which is applied to wagon top covers, tarpaulins or exposed fabric with a brush, like paint, until the fabric is thoroughly impregnated. The best practice is to give a coat to the fabric on both sides and a second finish coat on the outside. This causes a complete and thorough impregnation of the fabric with the coating or paint, and it will then be found that after long continued exposure to the weather the coating will not crack nor peel off, nor will it harden.

I have discovered by long continued experiments that finely pulverized wood charcoal will remain suspended in a perfect solution in the soapy water and will form a paste throughout which the charcoal element was substantially uniformly distributed. Experiments with lamp black disclose that the latter would settle out of the water when left to stand and would not produce the paste suitable to have the boiled oil stirred therein to give a permanent composition.

Having thus described my invention, what I claim as new and desire to secure by Letters Patent, is:—

1. The hereindescribed covering for fabric, consisting of a paste made up of soapy water and pulverized charcoal having oil mixed therein to thin it to the desired consistency.

2. The hereindescribed protective covering for fabric, which comprises pulverized charcoal, soapy water and boiled linseed oil.

3. The hereindescribed method of compounding a covering for fabrics, which consists in preparing a soapy water, adding pulverized charcoal thereto to produce a paste, and stirring boiled linseed oil into the paste.

4. The hereindescribed method of compounding a covering for fabrics, which consists in preparing a soapy water, adding pulverized charcoal thereto to produce a paste, allowing the paste to stand until it stiffens, and stirring boiled linseed oil into the paste.

5. The hereindescribed covering for fabric comprising the following ingredients in substantially the following proportions, to-wit, four parts of boiled linseed oil, two parts of pulverized charcoal, and three parts of water having dissolved therein substantially all of the soap which it will take up.

6. The hereindescribed covering for fabrics comprising the following ingredients in substantially the following proportions, to-wit, four parts of boiled linseed oil, two parts of pulverized charcoal, and three parts of water having dissolved therein substantially all of the green fig soap which it will take up.

7. The hereindescribed method of compounding a flexible coating for exposed fabrics, which consists in providing three parts of water having dissolved therein green fig soap in the proportion of about one heaping tablespoonful to the quart of water, then adding the soapy water slowly to two parts of pulverized charcoal, and stirring same to form a paste, and then adding slowly to the paste four parts of boiled linseed oil and stirring same in.

In testimony whereof I affix my signature.

HAVIK BRUYN.

Witness:
NOMIE WELSH.